Jan. 9, 1945.  A. Y. DODGE ET AL  2,366,843
ONE-WAY CLUTCH
Filed Jan. 24, 1944  2 Sheets-Sheet 1
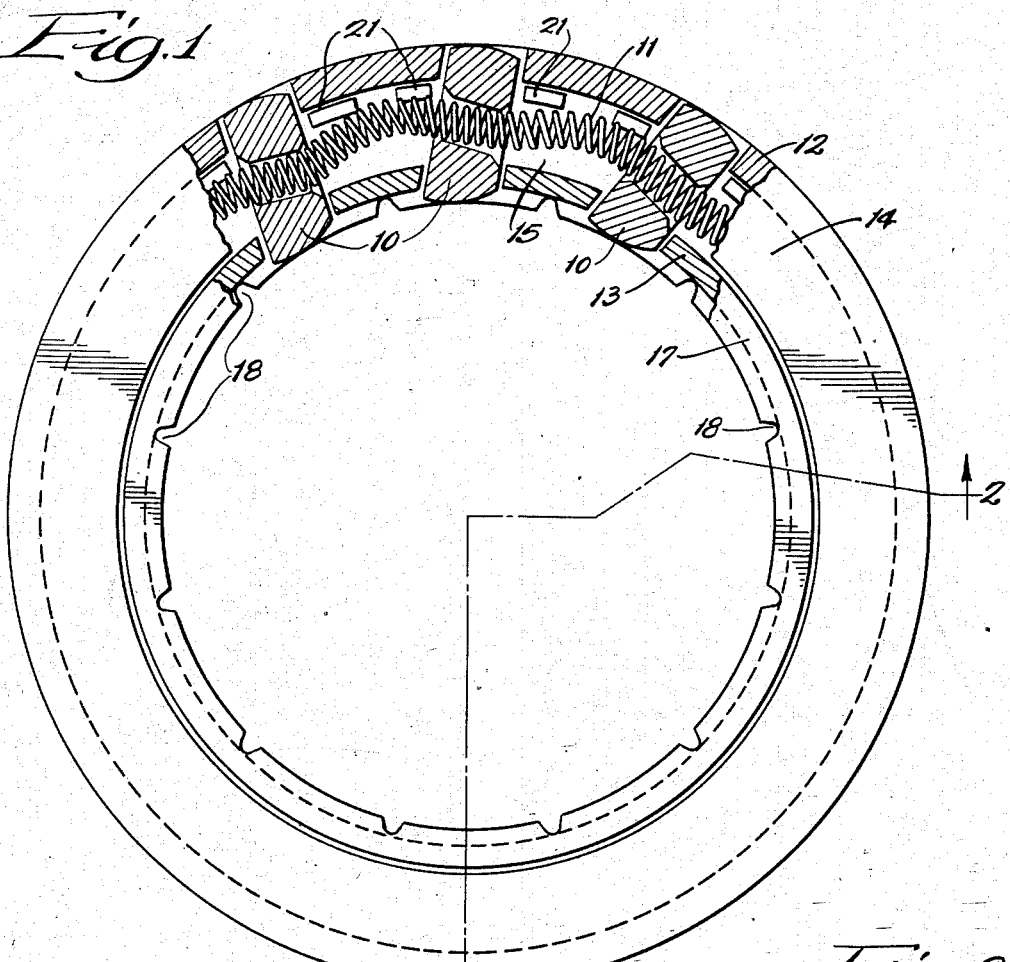
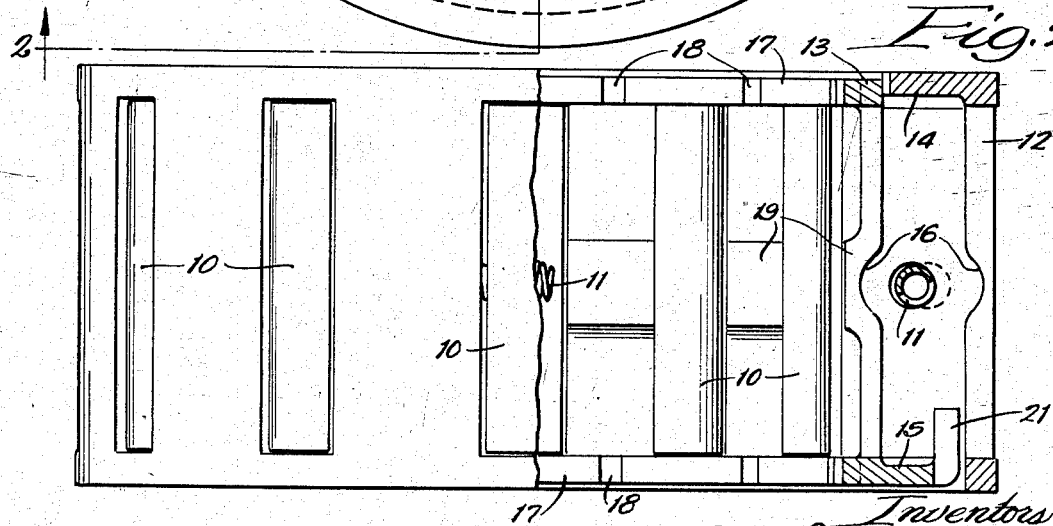
Inventors:
Adiel Y. Dodge and
Carl E. Swenson,
By Dawson, Ooms and Booth
Attorneys.

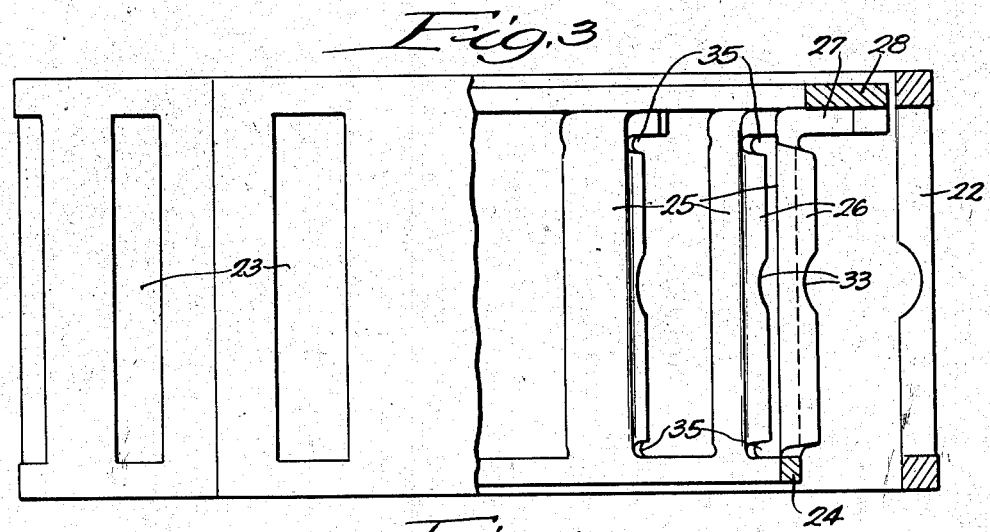
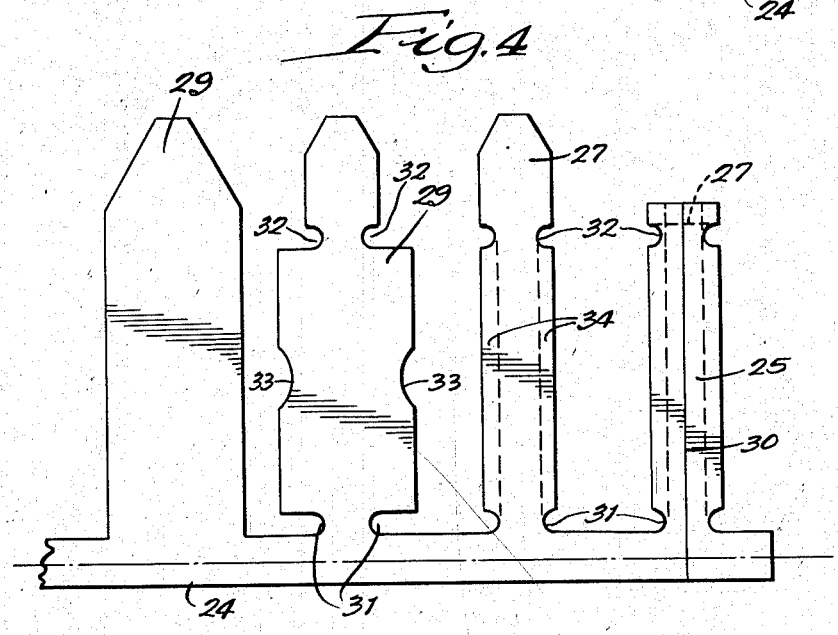

Patented Jan. 9, 1945

2,366,843

UNITED STATES PATENT OFFICE 2,366,843

ONE-WAY CLUTCH

Adiel Y. Dodge and Carl E. Swenson,
Rockford, Ill.

Application January 24, 1944, Serial No. 519,438

15 Claims. (Cl. 192—45.1)

This invention relates to one-way clutches and more particularly to tiltable gripper type clutches for connecting rotatable races in one relative direction of rotation.

One of the objects of the invention is to provide a one-way clutch in which the action of the grippers is not affected by centrifugal force produced by gyration of the clutch about a center displaced from the clutch axis. This is particularly important when the clutch is used in planetary gearing or the like.

Another object of the invention is to provide a one-way clutch which will engage and disengage rapidly as in response to impulses.

Still another object of the invention is to provide a one-way clutch having a two part cage frictionally engaging the races to assist in controlling the grippers. According to one important feature the frictional engagement is produced by a resilient construction functioning as a low rate spring and which is not affected by centrifugal force.

One specific feature of the invention provides a cage part which can be fabricated simply and inexpensively from sheet metal.

A further object of the invention is to provide a one-way clutch in which adequate circulation of lubricant over the several parts and more particularly over the inner race is insured.

A still further object is to provide a two part cage construction for controlling the grippers in which relative movement of the cage parts is limited. In one preferred construction, one of the cage parts is formed with spaced fingers engaging the grippers adjacent the other cage part.

The above and other objects and advantage of the invention will be more readily apparent from the following description when read in connection with the accompanying drawings, in which—

Figure 1 is an end elevation with parts in section of a one-way clutch embodying the invention;

Figure 2 is a transverse section on the broken line 2—2 of Figure 1;

Figure 3 is a view similar to Figure 2 of an alternative construction; and

Figure 4 is a developed view of the inner cage member of Figure 3 illustrating the steps in its manufacture.

The clutch shown in Figure 1 is adapted to connect inner and outer coaxial cylindrical races, not shown. Between the races there are arranged a series of tiltable grippers 10 which may be constructed as more particularly described and claimed in the copending application of Adiel Y. Dodge Serial No. 479,695 filed March 19, 1943. As shown the grippers have plain parallel sides with their ends curved about spaced centers so that when they are tilted clockwise as seen in Figure 1, they will disengage the races and when they are tilted counter-clockwise they will engage the races to transmit torque therebetween.

The several grippers are formed with central openings drilled at an angle somewhat greater than ninety degrees (90°) to their faces through which a helical spring 11 is threaded. The openings through the grippers are preferably at such an angle that the spring will be bent slightly as shown so that it will tend to tilt the grippers in a direction to engage the races even though the parallel sides of the grippers have assumed a radial position for some reason.

The grippers are held in spaced position between the races by a cage construction formed by an outer ring 12 and an inner ring 13. Each of the rings is formed with a series of peripherally spaced openings through which the ends of the grippers extend with the spring 11 lying between the rings. As best seen in Figure 2, the outer ring 12 is formed with an inwardly extending flange 14 at one end and a similarly outwardly extending flange 15 is formed on the inner ring at its opposite end. Preferably the rings are cut out as shown at 16 to provide clearance for the spring 11.

In order that oil may circulate freely through the clutch during operation, the inner ring 13 is formed with inwardly extending flanges 17 at its opposite ends in which notches 18 are cut. Such notches provide for axial flow of oil over the surface of the inner race and through the unit around the sprags and into all of the working spaces. Thus adequate lubrication is insured at all times. The inner and outer cages may be of such size that sufficient space for oil passage is provided between the cages and their respective races at the large diameter of the cages. This arrangement provides a gradually diminishing space for the oil film as revolution takes place, which insures the existence of an oil film at the tighter places between cage and race.

The rings are preferably controlled by frictional engagement with the races and for this purpose they may initially be formed oval shaped so that they will yieldingly grip the races. If desired, the entire ring may be pressed diametrically after being formed to give it a slight set. Preferably, only the unflanged ends of the rings are so deformed. The inner ring is shown as formed with central projecting parts 19 to provide clearance for the spring 11.

A resilient drag may also be provided by bending one or more of the cross bars of the inner cage inward toward center so that contact with the inner race occurs at 19. If diametrically opposite bars are bent inward, the available spring movement is doubled, yet the friction load is not materially increased by bending the bar opposite the first one.

With the parts assembled as shown in Figures 1 and 2, and inserted between coaxial races, the outer cage 12 will engage the outer race at its points of greatest diameter and the inner cage 13 will engage the inner race at its point of minimum diameter. When the inner race tends to rotate clockwise relative to the outer race as seen in Figure 1, the inner cage member will tend to turn clockwise relative to the outer cage member and will assist the spring 11 to tilt the grippers into engagement with the races. When the outer race tends to turn clockwise relative to the inner race the cage 12 will also tend to turn clockwise relative to the inner cage 13 and will engage the outer ends of the grippers at their left edges to tilt them out of engagement with the races. With this construction, the grippers respond very rapidly to changes in relative rotation between the races and will engage and disengage in response to rapid impulses. Furthermore, the friction drag of the cages while overrunning introduces a couple in the grippers counter to the couple induced by the spring member 11. This reduces the wear on the contacting surfaces of the grippers.

In order to limit the relative rotation of the cage members and thereby to limit the degree to which they can tilt the grippers, the flange 15 of the inner cage is formed with fingers 21 at one or more points in its periphery extending between the grippers and engageable therewith closely adjacent the outer cage member. As the cage members rotate relative to each other, the fingers 21 will engage the grippers adjacent the outer cage and will limit further relative rotation between the cage members. Thus the grippers can never be tilted to a point where they will leave the cage members.

Figures 3 and 4 illustrate an alternative construction of the cage including an outer cage member 22 in the form of a cylindrical drum having no flanges thereon and having openings 23 therein through which the outer ends of the grippers may extend. This cage may be made from perforated sheet strips, rolled and welded into a ring. The inner cage member is formed of sheet metal rolled into an annulus having a continuous flange 24 at one edge with a series of axially extending bars 25 connected to the flange. Each of the bars has its edges rolled outwardly as indicated at 26 to engage the grippers and has outwardly turned end portions 27 extending at right angles to the bars. The end portions 27 are connected by an annular ring 28 which may be welded or otherwise suitably secured thereto.

The inner race member may be made as shown in Figure 4 from a flat strip of metal which is first punched out to leave the edge portion 24 with a series of spaced outwardly extending fingers 29 connected thereto. In the next operation the fingers 29 are trimmed to form the notches 31 adjacent the edge portion 24 and similar notches 32 adjacent the opposite end. The sides may also be cut out at 33 to provide grooves for clearing the spring 11 in the assembled clutch unit. In the next step the sides of the fingers 29 are bent up as shown at 34 to form the outwardly extending flanges 26 on the sides of the bars 25. In the next step the end portion 27 is bent at right angles to the fingers. The strip may then be rolled into an annulus welded along one of the cross bars 25 as indicated by the weld line 30. Thereafter, the ring 28 is attached to the bent up end portions 27 and the cage member is completed.

In this construction the notches 31 and 32 form passages as shown at 35 in the completed assembly through which oil may circulate freely to insure adequate lubrication of the parts.

While two cage parts have been illustrated throughout we have found that for many installations, particularly where the clutch does not gyrate about a center spaced from its own axis, a single cage part is sufficient. Since the grippers normally bear against the outer race in response to centrifugal force, the outer cage ring is omitted and only the inner cage ring is employed. In operation the outer ends of the grippers bear against the outer race and the cage part frictionally engages the inner race so that the grippers will be tilted by the frictional effects in response to relative rotation of the races.

While two embodiments of the invention have been shown and described in detail herein, it is to be understood that they are illustrative only and are not intended as definition of the scope of the invention, reference being had for this purpose to the appended claims.

What is claimed is:

1. A one-way clutch adapted to operate between inner and outer coaxial races comprising a plurality of tiltable grippers adapted to be mounted between the races, a pair of cage rings adapted to be mounted between the races having spaced openings through which the ends of the grippers extend, the cage rings being rotatable relative to each other and at least one cage ring being formed for frictionally engaging the adjacent race.

2. A one-way clutch adapted to operate between inner and outer coaxial races comprising a plurality of tiltable grippers adapted to be mounted between the races, a pair of cage rings adapted to be mounted between the races having spaced openings through which the ends of the grippers extend, the cage rings being rotatable relative to each other and at least one cage ring being initially non-circular whereby it will resiliently frictionally engage the adjacent race.

3. A one-way clutch adapted to operate between inner and outer coaxial races comprising a plurality of tiltable grippers adapted to be mounted between the races, an annular spring member passing through substantially central openings in the grippers and urging the grippers toward engaged position, inner and outer cage rings having spaced openings through which the ends of the grippers extend and lying on opposite sides of the spring, the cage rings being rotatable relative to each other and being formed for frictionally engaging the inner and outer races respectively.

4. A one-way clutch adapted to operate between inner and outer coaxial races comprising a plurality of tiltable grippers adapted to be mounted between the races, a pair of cage rings adapted to be mounted between the races having spaced openings through which the ends of the grippers extend, the cage rings being rotatable relative to each other and each cage ring being formed for frictionally engaging the adjacent race, the cage rings being formed with passages for circulation of lubricant.

5. A one-way clutch adapted to operate between inner and outer coaxial races comprising a plurality of tiltable grippers adapted to be mounted between the races, a pair of cage rings adapted to be mounted between the races having spaced openings through which the ends of the grippers extend, the cage rings being rotatable relative to each other and each cage ring being formed for frictionally engaging the adjacent race, the cage ring adjacent the inner race being formed adjacent its axial ends with notches forming passages for circulation of lubricant.

6. A one-way clutch adapted to operate between inner and outer coaxial races comprising a plurality of tiltable grippers adapted to be mounted between the races, a pair of cage rings adapted to be mounted between the races having spaced openings through which the ends of the grippers extend, the cage rings being rotatable relative to each other and each cage ring being formed for frictionally engaging the adjacent race, the cage ring adjacent the inner race being formed with inwardly extending flanges at its ends having passages therein for circulation of lubricant.

7. A one-way clutch adapted to operate between inner and outer coaxial races comprising a plurality of tiltable grippers adapted to be mounted between the races, a pair of cage rings adapted to be mounted between the races having spaced openings through which the ends of the grippers extend, the cage rings being rotatable relative to each other and each cage ring being formed for frictionally engaging the adjacent race, and means on the cage rings to limit relative rotation therebetween to limit the amount the grippers can be tilted by movement of the rings.

8. A one-way clutch adapted to operate between inner and outer coaxial races comprising a plurality of tiltable grippers adapted to be mounted between the races, a pair of cage rings adapted to be mounted between the races having spaced openings through which the ends of the grippers extend, the cage rings being rotatable relative to each other and each cage ring being formed for frictionally engaging the adjacent race, and means on one of the cage rings engaging a gripper adjacent the other cage ring to limit relative rotation between the rings.

9. A one-way clutch adapted to operate between inner and outer coaxial races comprising a plurality of tiltable grippers adapted to be mounted between the races, a pair of cage rings adapted to be mounted between the races having spaced openings through which the ends of the grippers extend, the cage rings being rotatable relative to each other and each cage ring being formed for frictionally engaging the adjacent race, one of the cage rings having a radial flange at one end extending toward the other ring, and axially extending fingers on the flange engageable with a gripper to limit relative rotation between the rings.

10. In a one-way clutch, a cage construction for supporting a series of tiltable grippers comprising a pair of coaxial annular rings formed with openings to receive the ends of the grippers, said rings being oval whereby they will frictionally engage cylindrical races.

11. In a one-way clutch, a cage construction for supporting a series of tiltable grippers comprising a pair of coaxial annular rings formed with openings to receive the ends of the grippers, said rings being relatively rotatable, an end flange on one of the rings extending radially toward the other, and axially extending fingers on the flange projecting into the space between the rings.

12. In a one-way clutch, a cage construction for supporting a series of tiltable grippers comprising an annular sheet metal member having a continuous flange at one edge, spaced axially extending parts projecting from the flange with the ends of said parts bent at right angles, and a ring secured to said bent ends.

13. A one-way clutch for connecting coaxial inner and outer races comprising a series of tiltable grippers between the races, and a relatively thin cage ring adjacent the inner race formed with spaced openings through which the inner ends of the grippers extend, the cage ring being so constructed and arranged as to frictionally engage the inner race thereby to assist in controlling tilting of the grippers.

14. A one-way clutch for connecting coaxial inner and outer races comprising a series of tiltable grippers between the races, a relatively thin cage ring adjacent the inner race formed with spaced openings through which the inner ends of the grippers extend, the cage ring being so constructed and arranged as to frictionally engage the inner race thereby to assist in controlling tilting of the grippers, and an annular spring extending through openings in the grippers and engaging the grippers to urge them to tilt toward their engaging position.

15. A one-way clutch for connecting coaxial inner and outer races comprising a series of tiltable grippers between the races, and a relatively thin cage ring adjacent the inner race formed with spaced openings through which the inner ends of the grippers extend, the cage ring initially being non-circular whereby it will resiliently frictionally engage the inner race.

ADIEL Y. DODGE.
CARL E. SWENSON.